United States Patent (10) Patent No.: US 9,132,823 B2
Wakayama et al. (45) Date of Patent: Sep. 15, 2015

(54) COAST STOP VEHICLE AND CONTROL METHOD FOR COAST STOP VEHICLE

(71) Applicant: JATCO LTD, Fuji-shi, Shizuoka (JP)

(72) Inventors: Hideshi Wakayama, Hadano (JP); Keichi Tatewaki, Atsugi (JP); Naohiro Yamada, Atsugi (JP)

(73) Assignee: JATCO LTD, Fuji-shi (JP)

( * ) Notice: Subject to any disclaimer, the term of this patent is extended or adjusted under 35 U.S.C. 154(b) by 166 days.

(21) Appl. No.: 13/709,712

(22) Filed: Dec. 10, 2012

(65) Prior Publication Data

US 2013/0150208 A1 Jun. 13, 2013

(30) Foreign Application Priority Data

Dec. 12, 2011 (JP) .................................. 2011-271041

(51) Int. Cl.
*B60W 10/06* (2006.01)
*B60W 10/02* (2006.01)
(Continued)

(52) U.S. Cl.
CPC ............. *B60W 10/06* (2013.01); *B60W 10/023* (2013.01); *B60W 10/026* (2013.01); *B60W 10/107* (2013.01); *B60W 10/30* (2013.01); *B60W 30/18072* (2013.01); *B60W 2030/1809* (2013.01); *B60W 2520/10* (2013.01); *B60W 2710/028* (2013.01); *B60W 2710/0644* (2013.01); *B60W 2710/1005* (2013.01);
(Continued)

(58) Field of Classification Search
CPC ... B60W 10/06; B60W 10/107; B60W 20/30; B60W 20/50; B60W 30/18018; B60W 30/18027; B60W 30/18072; B60W 30/18154; B60W 30/19; B60W 2510/0647; B60W 2510/0652; B60W 2510/0661; B60W 2510/082; B60W 2510/084; B60W 2510/086; B60W 2540/30; B60W 2540/10; B60W 2540/103; B60W 2540/106; B60W 2710/0655; B60W 2710/0661; B60W 2710/0672; B60W 2710/082; B60W 2710/085; B60W 2710/10; B60W 2710/1044; B60W 2710/1055; B60W 2710/1005; B60W 2710/1016; B60W 2710/028; B60W 2710/0644; B60W 2710/1083; F16H 2312/14; F16H 61/66259; Y02T 10/48

See application file for complete search history.

(56) References Cited

U.S. PATENT DOCUMENTS 6,093,974 A * 7/2000 Tabata et al. ................. 290/40 R
6,102,831 A * 8/2000 Wakahara et al. ............ 477/169
(Continued)

FOREIGN PATENT DOCUMENTS

DE 10 2007 012875 A1 9/2008
DE 10 2009 045091 A1 3/2011
(Continued)

*Primary Examiner* — Derek D Knight
*Assistant Examiner* — David Morris
(74) *Attorney, Agent, or Firm* — Foley & Lardner LLP

(57) ABSTRACT

A coast stop vehicle for automatically stopping a drive source when a predetermined condition holds during the travel of the vehicle includes a drive source control unit adapted to control the automatic stop and the restart of the drive source, a transmission mechanism provided between the drive source and drive wheels, and a transmission control unit adapted to control a speed ratio of the transmission mechanism. When the drive source is restarted, the transmission control unit is adapted to control the transmission mechanism to a speed ratio higher than a predetermined speed ratio in response to an input shift request to the predetermined speed ratio, and the drive source control unit is adapted to restart the drive source in a state where the speed ratio of the transmission mechanism is higher than the predetermined speed ratio.

15 Claims, 9 Drawing Sheets

(51) Int. Cl.
    *B60W 10/107*    (2012.01)
    *B60W 10/30*    (2006.01)
    *B60W 30/18*    (2012.01)
    *F16H 37/02*    (2006.01)
    *F16H 61/662*    (2006.01)

(52) U.S. Cl.
    CPC .. *B60W2710/1083* (2013.01); *F16H 61/66259* (2013.01); *F16H 2037/023* (2013.01); *F16H 2312/14* (2013.01); *Y02T 10/48* (2013.01); *Y10T 477/636* (2015.01); *Y10T 477/656* (2015.01)

(56) References Cited

U.S. PATENT DOCUMENTS

| | | | |
|---|---|---|---|
| 6,151,978 A | 11/2000 | Huber | |
| 6,702,718 B2* | 3/2004 | Tani et al. | 477/203 |
| 7,497,800 B2* | 3/2009 | Sakata et al. | 475/136 |
| 7,670,257 B2* | 3/2010 | Popp et al. | 477/6 |
| 8,527,164 B2 | 9/2013 | Staudinger et al. | |
| 8,663,067 B2 | 3/2014 | Mair et al. | |
| 2002/0117338 A1* | 8/2002 | Itou | 180/54.1 |
| 2004/0046394 A1* | 3/2004 | Lim | 290/40 C |
| 2008/0017427 A1* | 1/2008 | Nakanowatari | 180/65.2 |
| 2010/0151991 A1 | 6/2010 | Mair et al. | |
| 2010/0250075 A1* | 9/2010 | Suzuki et al. | 701/55 |
| 2011/0054765 A1 | 3/2011 | Lewis et al. | |
| 2012/0245810 A1 | 9/2012 | Staudinger et al. | |

FOREIGN PATENT DOCUMENTS

| | | |
|---|---|---|
| JP | 2000-118266 A | 4/2000 |
| JP | 2001-041068 A | 2/2001 |

\* cited by examiner

COAST STOP VEHICLE AND CONTROL METHOD FOR COAST STOP VEHICLE

CROSS REFERENCE TO RELATED APPLICATIONS

This application claims priority from Japanese Patent Application No. 2011-271041, filed Dec. 12, 2011, which is incorporated herein by reference in its entirety.

TECHNICAL FIELD

The present invention relates to a coast stop vehicle and a control method for coast stop vehicle.

BACKGROUND ART

JP2000-118266A discloses a control device which restarts an engine in a first gear position (lowest gear position) when a driver has an intention to accelerate and the engine is restarted after the engine is automatically stopped.

SUMMARY OF INVENTION

When a driver has an intention to accelerate and an engine is restarted after the engine is automatically stopped, the driver often desires quick acceleration of a vehicle.

In the case of automatically stopping the engine while driving, the engine is driven by drive wheels, for example, by the release of a lock-up clutch of a torque converter or the like and an engine rotation speed is, for example, lower than a turbine rotation speed. If the engine rotation speed becomes higher than, for example, the turbine rotation speed when the driver has an intention to accelerate and the engine is restarted in such a state, the driver can feel the acceleration of the vehicle.

For example, when the driver has an intention to accelerate and the engine is restarted after the engine is automatically stopped in a second gear position, a shift request, e.g. a down-shift command may be output by the operation of the driver before an accelerator pedal is depressed. When a down-shift to the first gear position is performed in accordance with the down-shift command, the turbine rotation speed becomes, for example, higher than the turbine rotation speed in the second gear position before the down-shift. Thus, when the engine is restarted, it takes a longer time until the engine rotation speed becomes higher than the turbine rotation speed, which presents a problem that acceleration responsiveness to the driver's intention to accelerate cannot be achieved.

The present invention was developed to solve such a problem and aims to achieve acceleration responsiveness according to a driver's intention to accelerate when the driver has an intention to accelerate and an engine is restarted.

One aspect of the present invention is directed to a coast stop vehicle for automatically stopping a drive source when a predetermined condition holds during the travel of the vehicle, including a drive source control unit adapted to control the automatic stop and the restart of the drive source; a transmission mechanism provided between the drive source and drive wheels; and a transmission control unit adapted to control a speed ratio of the transmission mechanism; wherein, when the drive source is restarted, the transmission control unit is adapted to control the transmission mechanism to a speed ratio higher than a predetermined speed ratio in response to an input shift request to the predetermined speed ratio and the drive source control unit is adapted to restart the drive source in a state where the speed ratio of the transmission mechanism is higher than the predetermined speed ratio.

Another aspect of the present invention is directed to a control method for controlling a coast stop vehicle which automatically stops a drive source when a predetermined condition holds during the travel of the vehicle and includes a transmission mechanism between the drive source and drive wheels, including controlling the transmission mechanism to a speed ratio higher than a predetermined speed ratio in response to an input shift request to the predetermined speed ratio when the drive source is restarted; and restarting the drive source in a state where the speed ratio of the transmission mechanism is higher than the predetermined speed ratio.

According to these aspects, when the drive source is restarted, the speed ratio is controlled to be higher than the input predetermined speed ratio. By restarting the drive source in the state where the speed ratio of the transmission mechanism is higher than the predetermined speed ratio, a time until the vehicle is accelerated can be shortened and acceleration responsiveness according to a driver's intention to accelerate can be achieved.

DESCRIPTION OF EMBODIMENTS

Hereinafter, embodiments of the present invention are described with reference to the accompanying drawings. It should be noted that, in the following description, a "speed ratio" of a certain transmission is a value obtained by dividing an input rotation speed of this transmission by an output rotation speed thereof. Further, a "lowest speed ratio" is a maximum speed ratio of this transmission used such as at the time of starting a vehicle. A "highest speed ratio" is a minimum speed ratio of this transmission.

Figure 1:
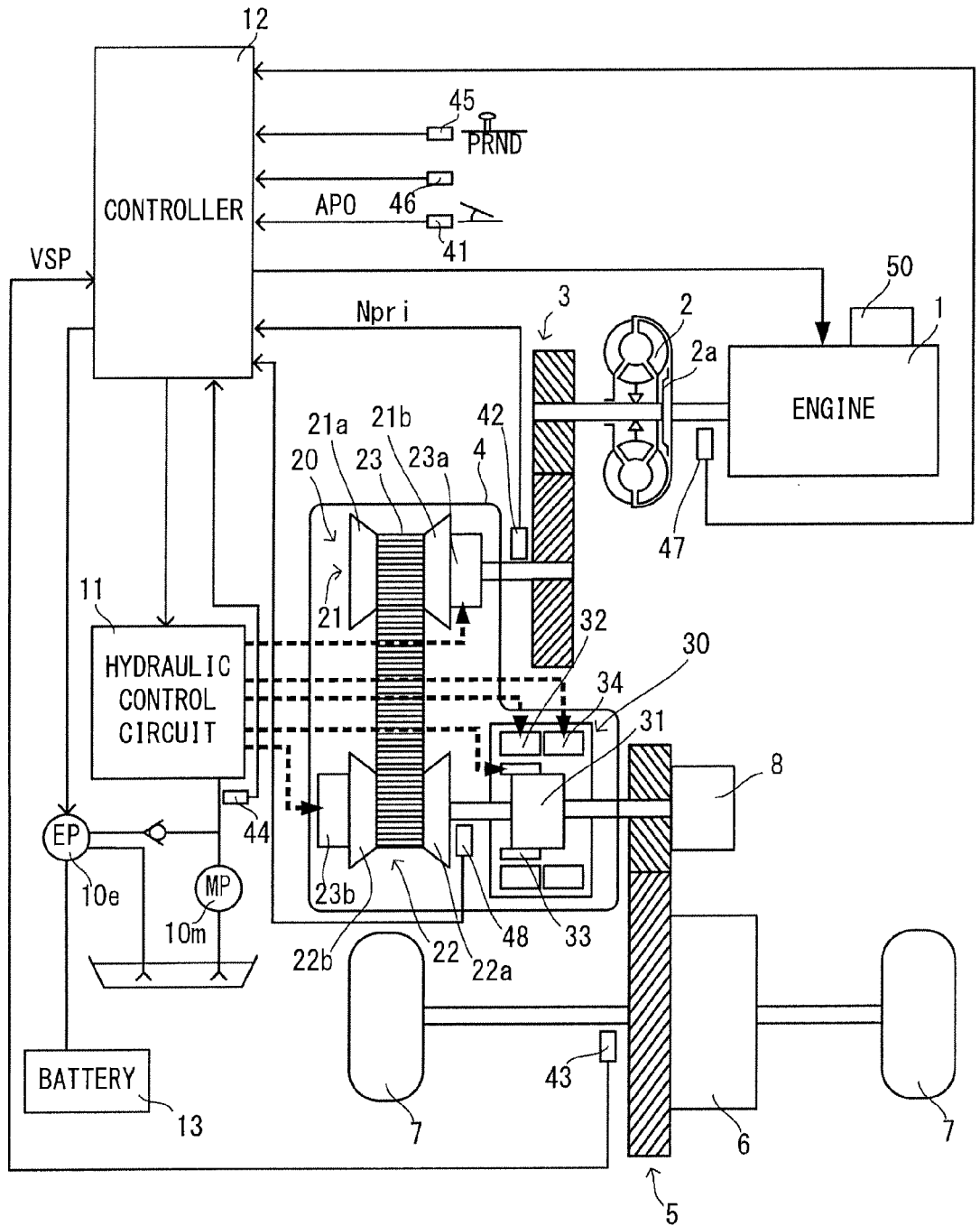
FIG. 1 is a schematic configuration diagram of a coast stop vehicle of a first embodiment.

FIG. 1 is a schematic configuration diagram of a coast stop vehicle according to this embodiment of the present invention. This vehicle includes an engine 1 as a drive source, and output rotation of the engine 1 is transmitted to drive wheels 7 via a torque converter 2 with a lock-up clutch 2a, a first gear train 3, a continuously variable transmission (hereinafter, merely referred to as a "transmission 4"), a second gear train 5 and a differential gear unit 6. The second gear train 5 includes a parking mechanism 8 for mechanically locking an output shaft of the transmission 4 in a parked state so as not to be able to rotate. The vehicle includes a starter 50 for starting the engine 1 by rotating a crankshaft of the engine 1.

The transmission 4 includes a mechanical oil pump 10m to which the rotation of the engine 1 is input and which is driven by utilizing a part of power of the engine 1 and an electrical oil pump 10e which is driven upon receiving the supply of power from a battery 13. The electrical oil pump 10e is composed of an oil pump main body, an electric motor and a motor driver for driving and rotating the oil pump main body, and can control an operating load to an arbitrary load or in multiple steps. Further, the transmission 4 includes a hydraulic control circuit 11 for adjusting a hydraulic pressure (hereinafter, referred to as a "line pressure") from the mechanical oil pump 10m or the electrical oil pump 10e and supplying the adjusted hydraulic pressure to each component of the transmission 4.

The transmission 4 includes a V-belt continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission or power transmission mechanism (e.g. gear train). Alternatively, the sub-transmission mechanism 30 may be connected before (input shaft side) the variator 20.

The variator 20 includes a primary pulley 21, a secondary pulley 22 and a V-belt 23 mounted between the pulleys 21 and 22. Each of the pulleys 21, 22 includes a fixed conical plate 21a, 22a, a movable conical plate 21b, 22b arranged with a sheave surface faced toward the fixed conical plate 21a, 22a and forming a V-groove between the fixed conical plate 21a, 22a and the movable conical plate 21b, 22b, and a hydraulic cylinder 23a, 23b provided on the back surface of the movable conical plate 21b, 22b for displacing the movable conical plate 21b, 22b in an axial direction. When hydraulic pressures supplied to the hydraulic cylinders 23a, 23b are adjusted, the widths of the V-grooves change to change contact radii of the V-belt 23 and the respective pulleys 21, 22, whereby a speed ratio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. If the supply of a hydraulic pressure to each frictional engagement element 32 to 34 is adjusted to change engaged and released states of each frictional engagement element 32 to 34, a gear position of the sub-transmission mechanism 30 is changed.

For example, the sub-transmission mechanism 30 is set to a first gear position if the low brake 32 is engaged and the high clutch 33 and the reverse brake 34 are released. The transmission mechanism 30 is set to a second gear position with a gear ratio smaller than in the first gear position if the high clutch 33 is engaged and the low brake 32 and the reverse brake 34 are released. Further, the sub-transmission mechanism 30 is set to a reverse gear position if the reverse brake 34 is engaged and the low brake 32 and the high clutch 33 are released. In the following description, a case where the sub-transmission mechanism 30 is in the first gear position is expressed by that "the transmission 4 is in a low-speed mode" and a case where the sub-transmission mechanism 30 is in the second gear position is expressed by that "the transmission 4 is in a high-speed mode".

Each of the frictional engagement elements is provided before or after the variator 20 on the power transmission path and any of them enables power transmission of the transmission 4 when being engaged while disabling power transmission of the transmission 4 when being released.

Figure 2:
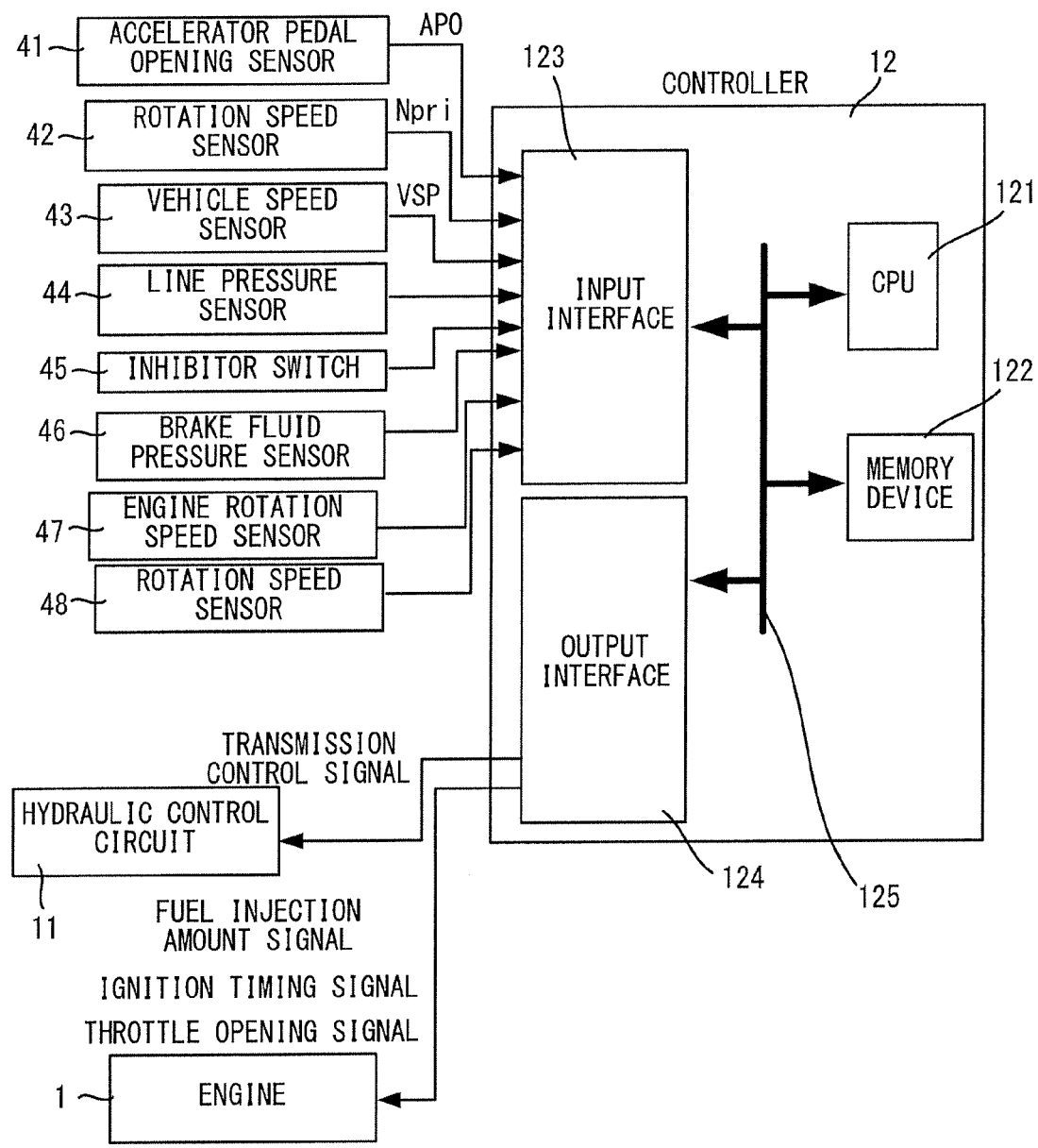
FIG. 2 is a schematic configuration diagram of a controller of the first embodiment.

A controller 12 is for controlling the engine 1 and the transmission 4 in a comprehensive manner and includes a CPU 121, a memory device 122 composed of a RAM/ROM, an input interface 123, an output interface 124 and a bus 125 which connects these components to each other as shown in FIG. 2.

To the input interface 123 are input an output signal of an accelerator pedal opening sensor 41 for detecting an accelerator pedal opening APO which is an operated amount of an accelerator pedal, an output signal of a rotation speed sensor 42 for detecting an input rotation speed of the transmission 4 (=rotation speed of the primary pulley 21, hereinafter, referred to as a "primary rotation speed Npri"), an output signal of a rotation speed sensor 48 for detecting an output rotation speed of the transmission 4 (=rotation speed of the secondary pulley 22, hereinafter, referred to as a "secondary rotation speed Nsec"), an output signal of a vehicle speed sensor 43 for detecting a vehicle speed VSP, an output signal of a line pressure sensor 44 for detecting a line pressure, an output signal of an inhibitor switch 45 for detecting the position of a select lever, an output signal of a brake fluid pressure sensor 46 for detecting a brake fluid pressure, an output signal of an engine rotation speed sensor 47 for detecting a rotation speed of the crankshaft of the engine 1 and like output signals.

A control program of the engine 1, a transmission control program of the transmission 4, and various maps and tables used in these programs are stored in the memory device 122. The CPU 121 reads the program stored in the memory device 122 and executes it, performs various computations on various signals input via the input interface 123 to generate a fuel injection amount signal, an ignition timing signal, a throttle opening signal, a transmission control signal and a drive signal for the electrical oil pump 10e, and outputs the generated signals to the engine 1, the hydraulic control circuit 11 and the motor driver of the electrical oil pump 10e via the output interface 124. Various values used in the computations by the CPU 121 and the results of these computations are appropriately stored in the memory device 122.

The hydraulic control circuit 11 includes a plurality of flow passages and a plurality of hydraulic control valves. In accordance with a transmission control signal from the controller 12, the hydraulic control circuit 11 controls the plurality of hydraulic control valves to switch supply paths of the hydraulic pressure, prepares a necessary hydraulic pressure from a hydraulic pressure produced by the mechanical oil pump 10m or the electrical oil pump 10e, and supplies this hydraulic pressure to each component of the transmission 4. In this way, the speed ratio of the variator 20 and the gear position of the sub-transmission mechanism 30 are changed to shift the transmission 4.

Figure 3:
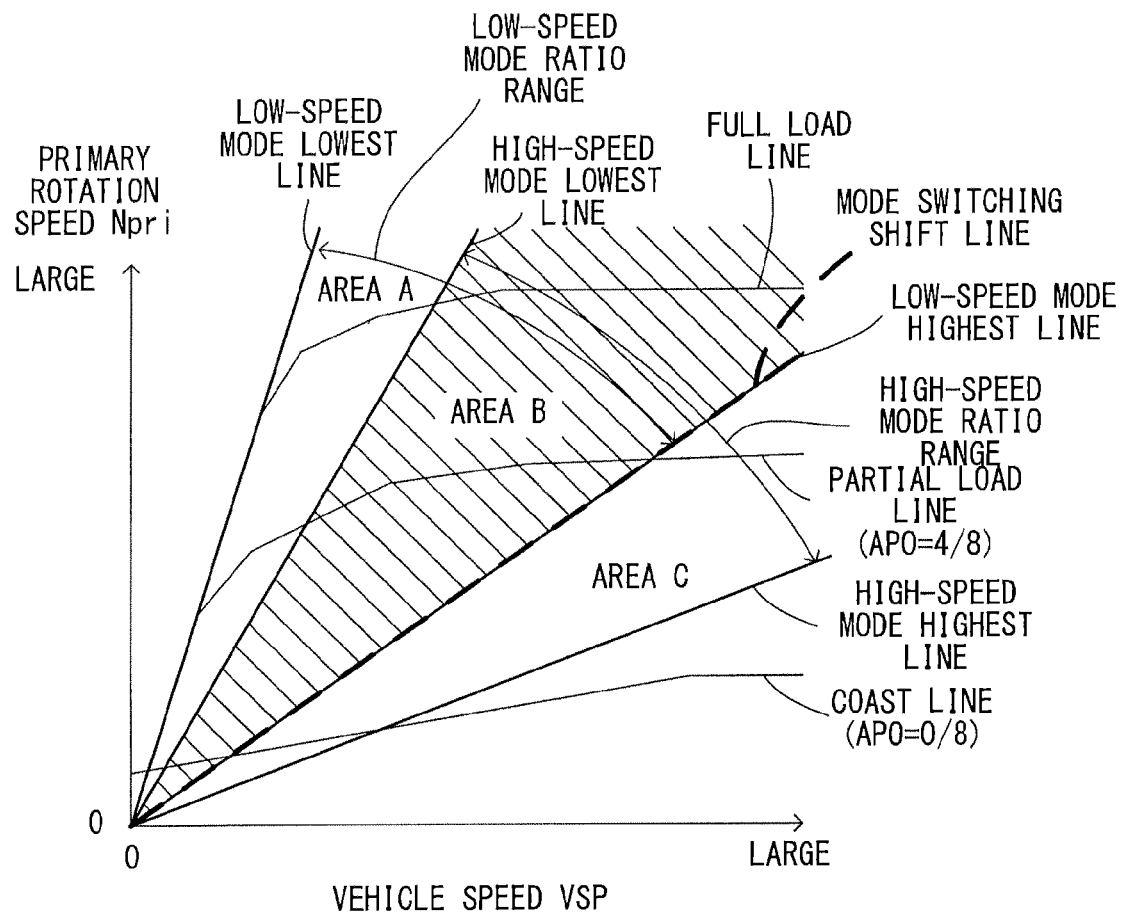
FIG. 3 is a graph showing an example of a shift map.

FIG. 3 shows an example of a shift map stored in the memory device 122. The controller 12 controls the variator 20 and the sub-transmission mechanism 30 in accordance with an operating state of the vehicle (vehicle speed VSP, primary rotation speed Npri, secondary rotation speed Nsec, and accelerator pedal opening APO in this embodiment) based on this shift map.

In this shift map, an operating point of the transmission 4 is determined by the vehicle speed VSP and the primary rotation speed Npri. The inclination of a line connecting the operating point of the transmission 4 and a zero point at the lower left corner of the shift map corresponds to the speed ratio of the transmission 4 (overall speed ratio obtained by multiplying a speed ratio of the variator 20 by a speed ratio of the sub-transmission mechanism 30, hereinafter, referred to as a "through speed ratio"). In this shift map, a shift line is set for each accelerator pedal opening APO similarly to a shift map of a conventional V-belt continuously variable transmission, and the transmission 4 is shifted in accordance with the shift line selected based on the accelerator pedal opening APO. It should be noted that, for simplicity, only a whole load line (shift line when the accelerator pedal opening APO=8/8), a partial line (shift line when the accelerator pedal opening APO=4/8) and a coast line (shift line when the accelerator pedal opening APO=0/8) are shown in FIG. 3.

When being in the low-speed mode, the transmission 4 can be shifted between a low-speed mode lowest line obtained by setting the speed ratio of the variator 20 at the lowest speed ratio and a low-speed mode highest line obtained by setting the speed ratio of the variator 20 at the highest speed ratio. In this case, the operating point of the transmission 4 moves in areas A and B. On the other hand, when being in the high-speed mode, the transmission 4 can be shifted between a high-speed mode lowest line obtained by setting the speed ratio of the variator 20 at the lowest speed ratio and a high-speed mode highest line obtained by setting the speed ratio of the variator 20 at the highest speed ratio. In this case, the operating point of the transmission 4 moves in areas B and C.

The speed ratio of each gear position of the sub-transmission mechanism 30 is so set that the speed ratio corresponding to the low-speed mode highest line (low-speed mode highest speed ratio) is smaller than the speed ratio corresponding to the high-speed mode lowest line (high-speed mode lowest speed ratio). By this, a range of the through speed ratio of the transmission 4 that can be set in the low-speed mode ("low-speed mode ratio range" in FIG. 3) and a range of the through speed ratio of the transmission 4 that can be set in the high-speed mode ("high-speed mode ratio range" in FIG. 3) partly overlap, and the transmission 4 can be selectively set in either one of the low-speed mode and the high-speed mode if the operating point of the transmission 4 is in the area B defined between the high-speed mode lowest line and the low-speed mode highest line.

Further, on this shift map, a mode switch shift line at which the sub-transmission mechanism 30 is shifted is so set as to overlap the low-speed mode highest line. A through speed ratio corresponding to the mode switch shift line (hereinafter, referred to as a "mode switch speed ratio mRatio") is set at a value equal to the low-speed mode highest speed ratio. The mode switch shift line is set in this way because an input torque to the sub-transmission mechanism 30 decreases as the speed ratio of the variator 20 decreases and a shift shock at the time of shifting the sub-transmission mechanism 30 is suppressed.

When the operating point of the transmission 4 crosses the mode switch shift line, i.e. an actual value of the through speed ratio (hereinafter, referred to as an "actual through speed ratio Ratio") changes over the mode switch speed ratio mRatio, the controller 12 performs a synchronization shift described below to switch between the high-speed mode and the low-speed mode.

In the synchronization shift, the controller 12 shifts the sub-transmission mechanism 30 and changes the speed ratio of the variator 20 in a direction opposite to a direction in which the speed ratio of the sub-transmission mechanism 30 is changed. At this time, an inertia phase in which the speed ratio of the sub-transmission mechanism 30 actually changes and a period during which the speed ratio of the variator 20 changes are synchronized. The speed ratio of the variator 20 is changed in the direction opposite to the direction in which the speed ratio of the sub-transmission mechanism 30 is changed to prevent a change in the input rotation caused by a step in the actual through speed ratio Ratio from giving a sense of incongruity to a driver.

Specifically, when the actual through speed ratio Ratio of the transmission 4 changes from a low side to a high side over the mode switch speed ratio mRatio, the controller 12 changes the gear position of the sub-transmission mechanism 30 from the first gear position to the second gear position (1-2 shift) and changes the speed ratio of the variator 20 to the low side.

Conversely, when the actual through speed ratio Ratio of the transmission 4 changes from the high side to the low side over the mode switch speed ratio mRatio, the controller 12 changes the gear position of the sub-transmission mechanism 30 from the second gear position to the first gear position (2-1 shift) and changes the speed ratio of the variator 20 to the high side.

The controller 12 performs a coast stop control described below to suppress a fuel consumption amount.

The coast stop control is a control for suppressing the fuel consumption amount by automatically stopping the engine 1 (coast stop) during the travel of the vehicle in a low speed range. The coast stop control is common to a fuel-cut control performed when an accelerator is off in that fuel supply to the engine 1 is stopped, but differs therefrom in that the power transmission path between the engine 1 and the drive wheels 7 is cut off to completely stop the rotation of the engine 1 by releasing the lock-up clutch 2a.

Upon performing the coast stop control, the controller 12 first judges, for example, conditions (first predetermined condition) a to d listed below and the like. These conditions are, in other words, conditions for judging whether or not a driver has an intention to stop the vehicle.

a: accelerator pedal is not depressed at all (accelerator position APO=0).
b: brake pedal is depressed (brake fluid pressure is not lower than a predetermined value).
c: vehicle speed is a predetermined low speed (e.g. 9 km/h) or lower.
d: sub-transmission mechanism 30 is in the second gear position.

When all of these coast stop conditions are satisfied, the controller 12 performs the coast stop control by outputting a signal for automatically stopping the engine 1 and stopping fuel injection into the engine 1. On the other hand, if a coast stop cancellation condition such as that any one of the above coast stop conditions is not satisfied holds, the controller 12 finishes the coast stop control by outputting a signal for restarting the engine 1 and resuming fuel injection into the engine 1.

Figure 4:
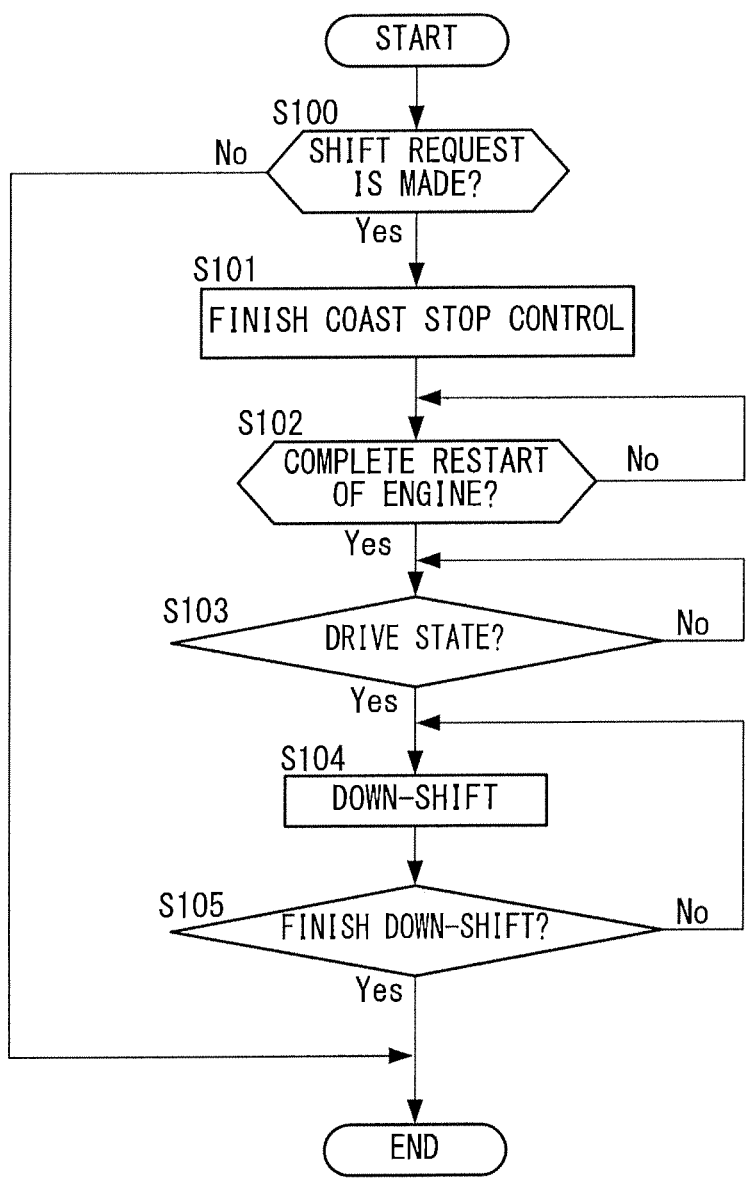
FIG. 4 is a flow chart showing a control performed when a shift request is made during a coast stop control of the first embodiment.

Next, a control performed when a driver has an intention to accelerate and a shift request is made during the coast stop control of this embodiment is described using a flow chart of FIG. 4. It should be noted that, here, the coast stop control is assumed to be performed when all of the coast stop conditions are satisfied.

In Step S100, the controller 12 determines whether or not a shift request is made by the driver during the coast stop control. Specifically, the controller 12 determines whether or not a shift request to a predetermined speed ratio has been made by the driver and a down-shift command has been output. The controller 12 proceeds to Step S101 if the down-shift command has been output while finishing this control unless the down-shift command has been output. The down-shift command to the predetermined speed ratio by the driver is output, for example, if the shift lever is operated from D-range to S-range or L-range, a "minus" operation of the shift lever is performed, a "minus" switch is operated in a manual mode or the depressed amount of the accelerator pedal is large. That is, the predetermined speed ratio is a speed ratio corresponding to the shift request by the driver. When such a shift request is made by the driver during the coast stop control, it can be thought that the driver has an intention to accelerate and a shift request is made.

In Step S101, the controller 12 finishes the coast stop control by resuming fuel injection into the engine 1.

In Step S102, the controller 12 determines whether or not the restart of the engine has been completed. The controller 12 proceeds to Step S103 when the restart of the engine is completed. The controller 12 determines based on a signal from the engine rotation speed sensor 47 that the restart of the engine 1 has been completed if the engine rotation speed becomes equal to or higher than a predetermined rotation speed. The predetermined rotation speed is a speed set in advance by an experiment or the like.

In Step S103, the controller 12 determines whether or not the vehicle is in a drive state where the vehicle is accelerated by a drive force generated by the engine 1. The controller 12 proceeds to Step S104 if the vehicle is in the drive state. Specifically, the controller 12 determines that the vehicle becomes the drive state if the engine rotation speed that is a rotation speed of the engine 1 side of the torque converter 2 is higher than a turbine rotation speed which is a rotation speed of the drive wheels 7 side of the torque converter 2. The turbine rotation speed is calculated based on a signal from the rotation speed sensor 42 and a gear ratio in the first gear train 3. The vehicle becomes a coast state when the coast stop control is performed and the vehicle is not in the drive state and not accelerated. Here, the controller 12 determines whether or not a transition from the coast state to the drive state has been made.

In Step S104, the controller 12 performs a down-shift by changing a target speed ratio according to the shift request by the driver.

In this embodiment, the target speed ratio is not changed and a shift corresponding to the driver's shift request is not performed until the restart of the engine 1 is completed and the engine rotation speed becomes higher than the turbine rotation speed even if the shift request is made by the driver and the down-shift command is output in Step S100.

In Step S105, the controller 12 determines whether or not the down-shift has been finished. The controller 12 finishes this control if the down-shift is finished while returning to Step S104 unless the down-shift is finished.

Figure 5:
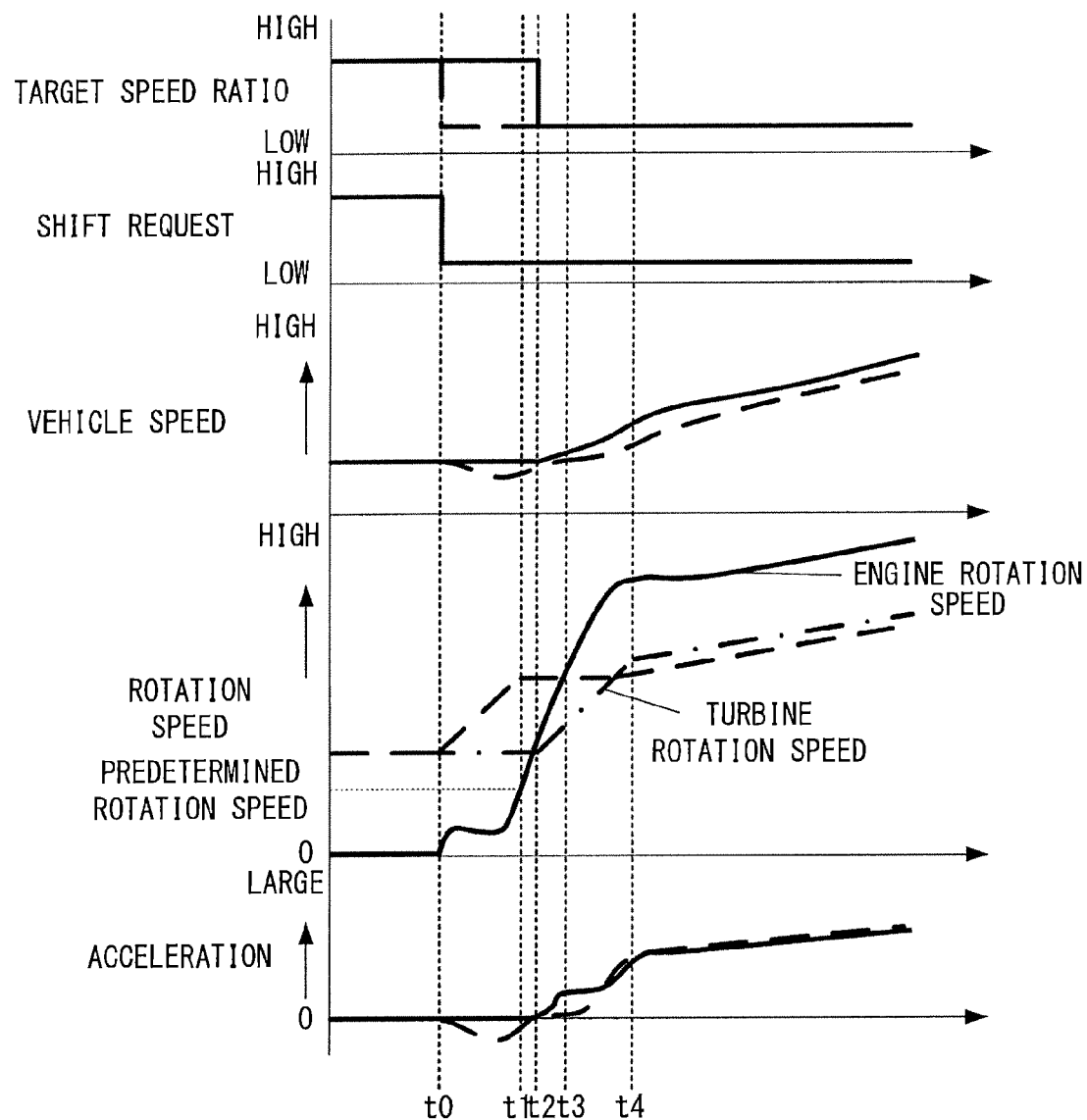
FIG. 5 is a time chart showing a control performed when a shift request is made during the coast stop control of the first embodiment.

Next, a control performed when a shift request is made during the coast stop control of this embodiment is described using a time chart of FIG. 5. In FIG. 5, the target speed ratio, the vehicle speed, the turbine rotation speed and the acceleration when this embodiment is not used and the down-shift is performed immediately after the down-shift command is output are shown by broken line. Further, the turbine rotation speed in the case of using this embodiment is shown by dashed-dotted line.

At time t0, the down-shift command is output in response to the driver's shift request. Since this causes the coast stop control to be finished and the engine 1 to restart, the engine rotation speed increases. Here, the vehicle is not accelerated since the turbine rotation speed is higher than the engine rotation speed.

Since the down-shift is performed in response to the shift command in the case of not using this embodiment, the target speed ratio is changed to a lower side. The transmission is shifted to realize the target speed ratio. Thus, the turbine rotation speed increases. Here, since a momentum of the drive wheels side is used as a torque for increasing the turbine rotation speed, the acceleration of the vehicle temporarily becomes a negative value. This causes a traction shock. On the other hand, in the case of using this embodiment, a traction shock does not occur since a shift is not performed here.

At time t1, the engine rotation speed becomes equal to or higher than the predetermined rotation speed and the restart of the engine 1 is completed.

At time t2, the engine rotation speed becomes higher than the turbine rotation speed, the vehicle becomes the drive state and the vehicle enters an accelerated state by a drive force generated by the engine 1. Then, the target speed ratio is changed based on the down-shift command and the transmission 4 is shifted. In the case of not using this embodiment, the vehicle is not accelerated even at time t2 since the turbine rotation speed is higher than the engine rotation speed.

In the case of not using this embodiment, the engine rotation speed becomes higher than the turbine rotation speed and the vehicle enters the accelerated state at time t3.

At time t4, the down-shift is finished.

As just described, the vehicle can be quickly accelerated by using this embodiment.

Effects of the first embodiment of the present invention are described.

The embodiment of the present invention solves a problem which occurs in the case of performing the coast stop control. An idle stop control performed after the vehicle stops is known as a control for automatically stopping an engine. In the idle stop control, a vehicle speed is zero, and an engine rotation speed and a turbine rotation speed are both zero when an acceleration request (shift request) is made in this state and the engine is restarted. Thus, the vehicle becomes a drive state immediately after the engine is restarted and the engine rotation speed increases and a driver can feel the acceleration of the vehicle. However, if an acceleration request (shift request) is made in a state where the coast stop control is performed and the engine is restarted, the vehicle does not become the drive state and the vehicle is not accelerated immediately after the engine rotation speed increases since the turbine rotation speed is not zero. How to reduce the turbine rotation speed is a problem in setting the vehicle in the drive state and achieving acceleration responsiveness intended by the driver in such a state, and this problem is solved in the embodiment of the present invention.

If the shift request is made by the driver during the coast stop control, the engine 1 is restarted in a state where the speed ratio of the transmission 4 is higher than a speed ratio corresponding to the shift request. By this, a time until the vehicle becomes the drive state after the restart of the engine 1 can be shortened and the acceleration responsiveness according to the driver's intention to accelerate can be achieved.

If a transmission is shifted immediately after a shift request is made by a driver without using this embodiment, a shift corresponding to the shift request is finished early, but it takes a longer time until a vehicle becomes the drive state. During this time, the vehicle is not accelerated by a drive force generated by an engine and it takes a longer time until the vehicle enters the accelerated state.

In this embodiment, a shift corresponding to the shift request by the driver is performed after the engine 1 is restarted and the vehicle becomes the drive state. This suppresses an increase in the turbine rotation speed after the restart of the engine 1, enables the vehicle to quickly become in the drive state after the restart of the engine 1 and shortens a time until the vehicle enters the accelerated state by the drive force generated by the engine 1 although it takes a longer time until the shift corresponding to the shift request is finished. Thus, acceleration responsiveness intended by the driver can be achieved. Particularly, when the shift request by the driver is a down shift, a time until the vehicle becomes the drive state after the shift request can be shortened and acceleration responsiveness according to the driver's intention to accelerate can be achieved.

A case where the shift request, e.g. a down-shift request, is made by the driver during the coast stop control is thought to be a case where it is intended to increase engine braking in addition to a case where the driver has an intention to accelerate.

During the coast stop control, a second torque transmitted from drive wheels to a transmission is higher than a first torque transmitted from an engine to the transmission. However, since the coast stop control is performed in a very low-speed region immediately before a vehicle stops, a difference between the first and second torques is small. If a drive source is restarted based on a down-shift request in such a state, there is a possibility that the first torque increases and exceeds the second torque. A state where the first torque exceeds the second torque is an accelerated state. Specifically, there is a possibility of entering the accelerated state although the down-shift request is made by the driver to increase engine braking.

Further, a braking force needs to be increased in the case of increasing engine braking. This can be realized by increasing the depressed amount of a brake pedal, i.e. by the driver's operation. On the other hand, the vehicle cannot be accelerated even if the driver has an intention to accelerate (e.g. even if an accelerator pedal is largely depressed) until the vehicle becomes the drive state after the restart of the drive source in response to the driver's intention to accelerate. Specifically, the acceleration of the vehicle cannot be realized by the driver's operation. Thus, a control needs to be performed for an operating state which cannot be realized by the driver's operation.

For these reasons, if a shift request is made by the driver, the above control is performed assuming the driver's intention to accelerate in this embodiment.

Next, a second embodiment of the present invention is described.

Figure 6:
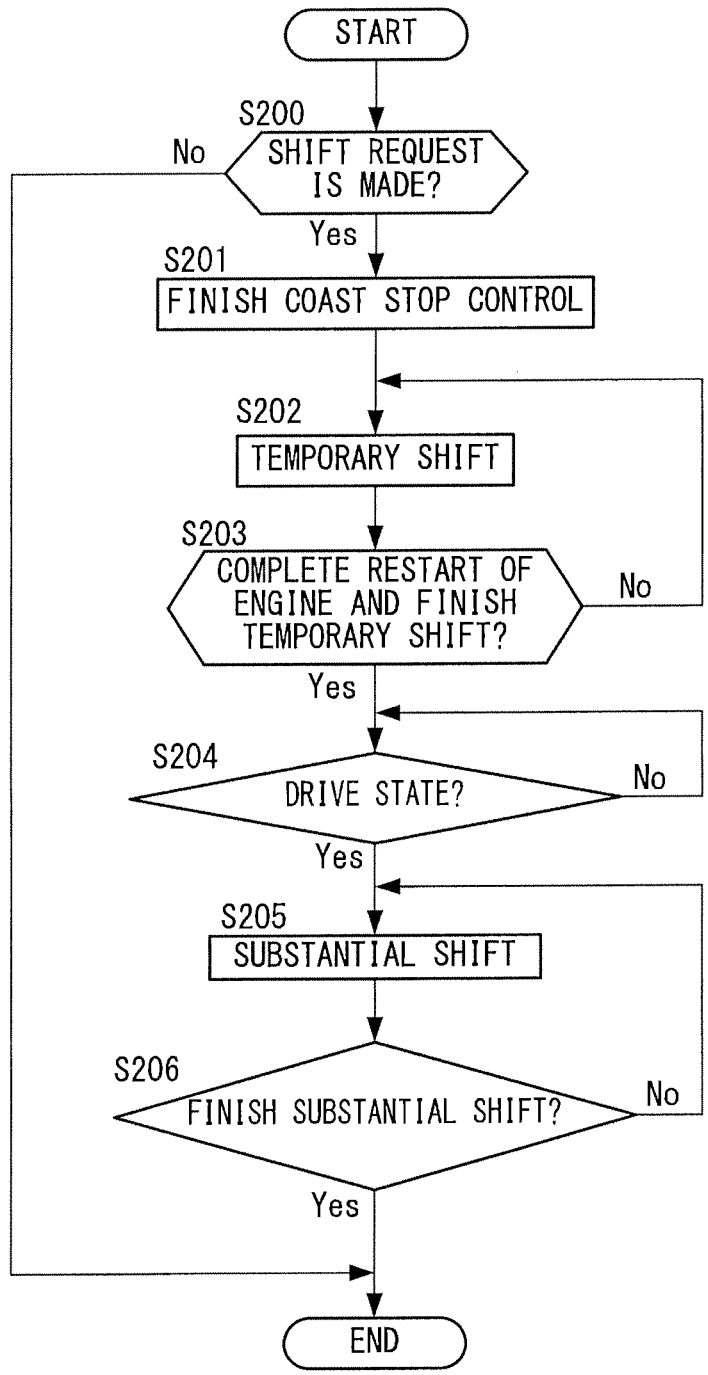
FIG. 6 is a flow chart showing a control performed when a shift request is made during a coast stop control of a second embodiment.

This embodiment differs from the first embodiment in the control performed when the shift request is made during the coast stop control. A control performed when a shift request is made during a coast stop control of this embodiment is described using a flow chart of FIG. 6.

In Step S200, the controller 12 determines whether or not a shift request is made by the driver during the coast stop control. The controller 12 determines whether or not an up-shift command has been output in addition to a down-shift command. The controller 12 proceeds to Step S201 if a shift command to a predetermined speed ratio by the driver has been output while finishing this control unless the shift command by the driver has been output. The up-shift command by the driver is output, for example, if a "plus" operation of the shift lever is performed, a "plus" switch is operated in the manual mode or the depressed amount of the accelerator pedal is small. When such a shift request is made by the driver during the coast stop control, it can be thought that the driver has an intention to accelerate and a shift request is made.

In Step S201, the controller 12 finishes the coast stop control by resuming fuel injection into the engine 1.

In Step S202, the controller 12 sets a temporary speed ratio which is higher than a speed ratio based on a shift command output by the shift request by the driver and a speed ratio before the shift request by the driver is made, and performs a temporary shift so that the speed ratio of the transmission 4 reaches the temporary speed ratio.

If r1 denotes the speed ratio before the shift request by the driver is made, r2 denotes the speed ratio based on the shift request by the driver and r3 denotes the temporary speed ratio, the speed ratios become smaller in the order of r2, r1, r3 (r2>r1>r3) if the shift request by the driver relates to a down-shift. On the other hand, if the shift request by the driver relates to an up-shift, the speed ratios become smaller in the order of r1, r2, r3 (r1>r2>r3).

In this embodiment, the temporary shift is performed before this control that is a shift corresponding to the shift request by the driver.

In Step S203, the controller 12 determines whether or not the restart of the engine 1 has been completed and the temporary shift has been finished. The controller 12 proceeds to S204 if the restart of the engine 1 has been completed and the temporary shift has been finished while returning to Step S202 to repeat the above control unless the restart of the engine 1 has been completed or unless the temporary shift has been finished. The restart of the engine 1 is determined by the same method as in Step S102.

In Step S204, the controller 12 determines whether or not the vehicle is in the drive state. The controller 12 proceeds to Step S205 if the vehicle is in the drive state. A specific determination method is the same as in Step S103.

In Step S205, the controller 12 performs a substantial shift by changing the target speed ratio according to the shift request by the driver.

In Step S206, the controller 12 determines whether or not the substantial shift has been finished. The controller 12 finishes this control when the substantial shift is finished while returning to Step S205 unless the substantial shift is finished.

Figure 7:
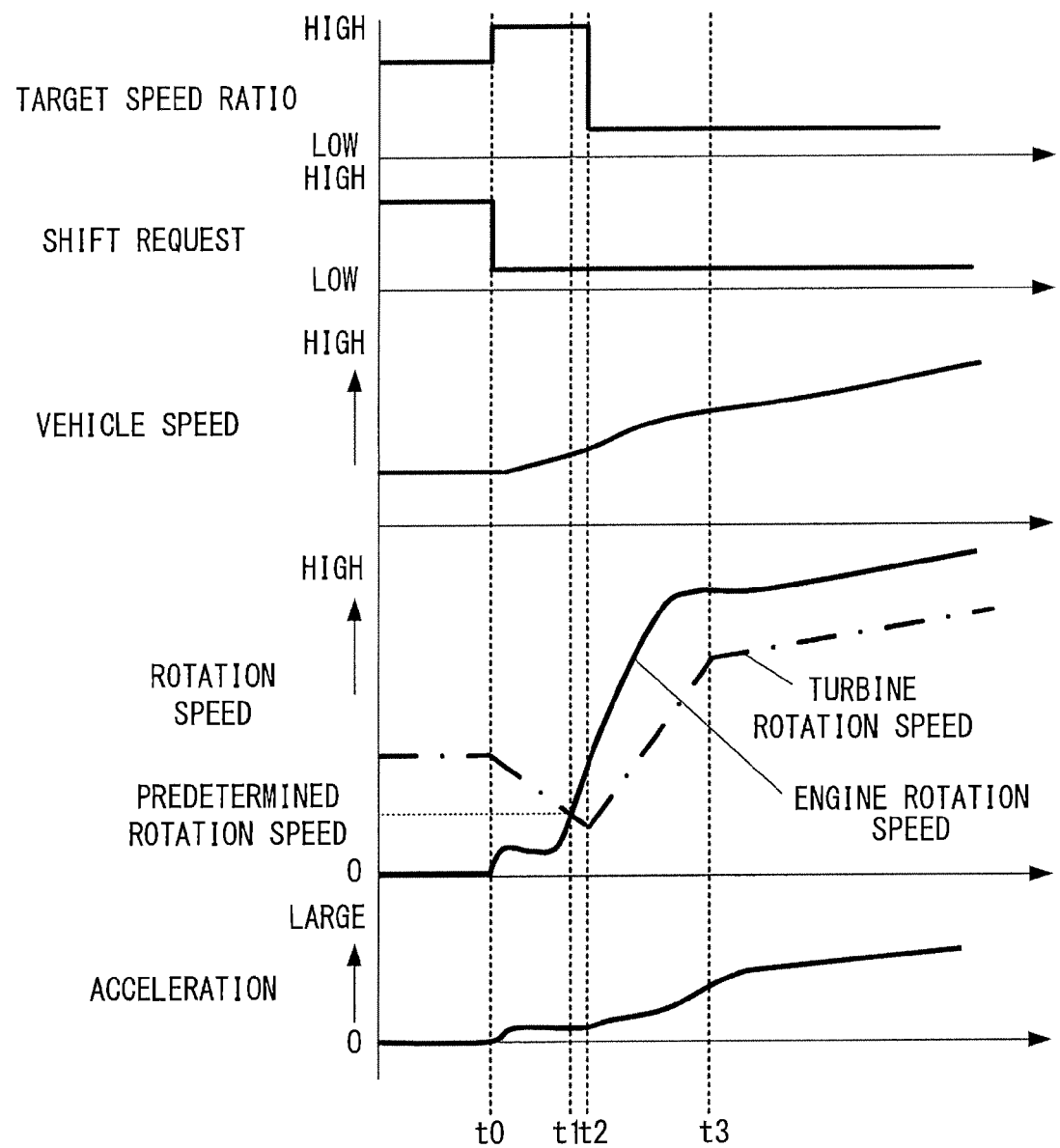
FIG. 7 is a time chart showing a control performed when a shift request is made during the coast stop control of the second embodiment.
Figure 8:
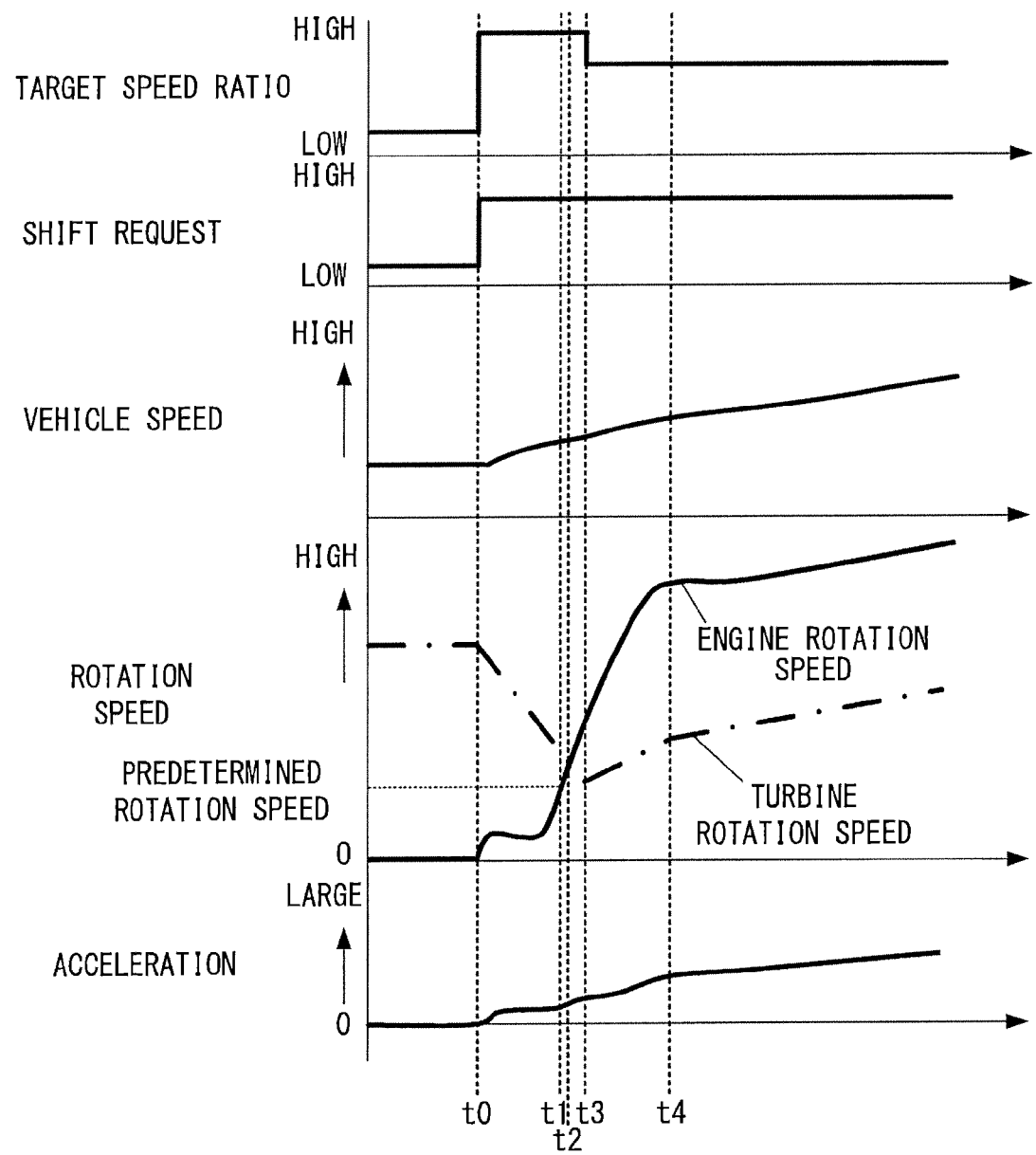
FIG. 8 is a time chart showing a control performed when a shift request is made during the coast stop control of the second embodiment.

Next, controls of this embodiment performed when the shift request is made are described using time charts of FIGS. 7 and 8. FIG. 7 is a time chart when the driver's shift request relates to a down-shift, wherein the turbine rotation speed is shown by dashed-dotted line.

At time t0, the down-shift command is output by the driver's shift request. The target speed ratio is set to be higher in response to the down-shift command and the temporary shift is started. Since the target speed ratio is changed to be higher and the transmission 4 is shifted in pursuit of the target speed ratio, the turbine rotation speed decreases. At this time, since an angular momentum of the turbine rotation speed is transmitted to the output shaft, the vehicle is accelerated.

At time t1, the engine rotation speed becomes higher than the turbine rotation speed. Further, the engine rotation speed becomes equal to or higher than the predetermined rotation speed and the restart of the engine 1 is completed.

At time t2, the temporary shift is finished. Since the engine rotation speed is higher than the turbine rotation speed and the vehicle is in the drive state at this time, the target speed ratio is changed in response to the down-shift command and the substantial control is started.

At time t3, the substantial control is finished.

FIG. 8 is a time chart when the driver's shift request relates to an up-shift, wherein the turbine rotation speed is shown by dashed-dotted line.

At time t0, the up-shift command is output by the driver's shift request. The target speed ratio is set to be even higher than the speed ratio based on the shift command in response to the up-shift command and the temporary shift is started. Since the transmission 4 is shifted in pursuit of the target speed ratio, the turbine rotation speed decreases. At this time, since an angular momentum of the turbine rotation speed is transmitted to the output shaft, the vehicle is accelerated.

At time t1, the engine rotation speed becomes higher than the predetermined rotation speed.

At time t2, the engine rotation speed becomes higher than the turbine rotation speed.

At time t3, the temporary shift is finished. Since the engine rotation speed is already higher than the turbine rotation speed and the vehicle is in the drive state at this time, the target speed ratio is changed in response to the up-shift command and the substantial control is started.

At time t4, the substantial control is finished.

Effects of the second embodiment of the present invention are described.

When the down-shift command is output by the driver during the coast stop control, the transmission 4 is temporarily shifted so that the speed ratio thereof becomes higher than the speed ratio based on the down-shift command and the substantial shift corresponding to the shift request by the driver is performed after the vehicle becomes the drive state, whereby a time until the vehicle becomes the drive state can be made even shorter and acceleration responsiveness intended by the driver can be achieved.

When the up-shift command is output by the driver during the coast stop control, the transmission 4 is temporarily shifted so that the speed ratio thereof becomes even higher than the speed ratio based on the shift command and the substantial shift corresponding to the shift request by the driver is performed after the vehicle becomes the drive state, whereby a time until the vehicle becomes the drive state can be made even shorter and acceleration responsiveness intended by the driver can be achieved.

Next, a third embodiment of the present invention is described.

Figure 9:
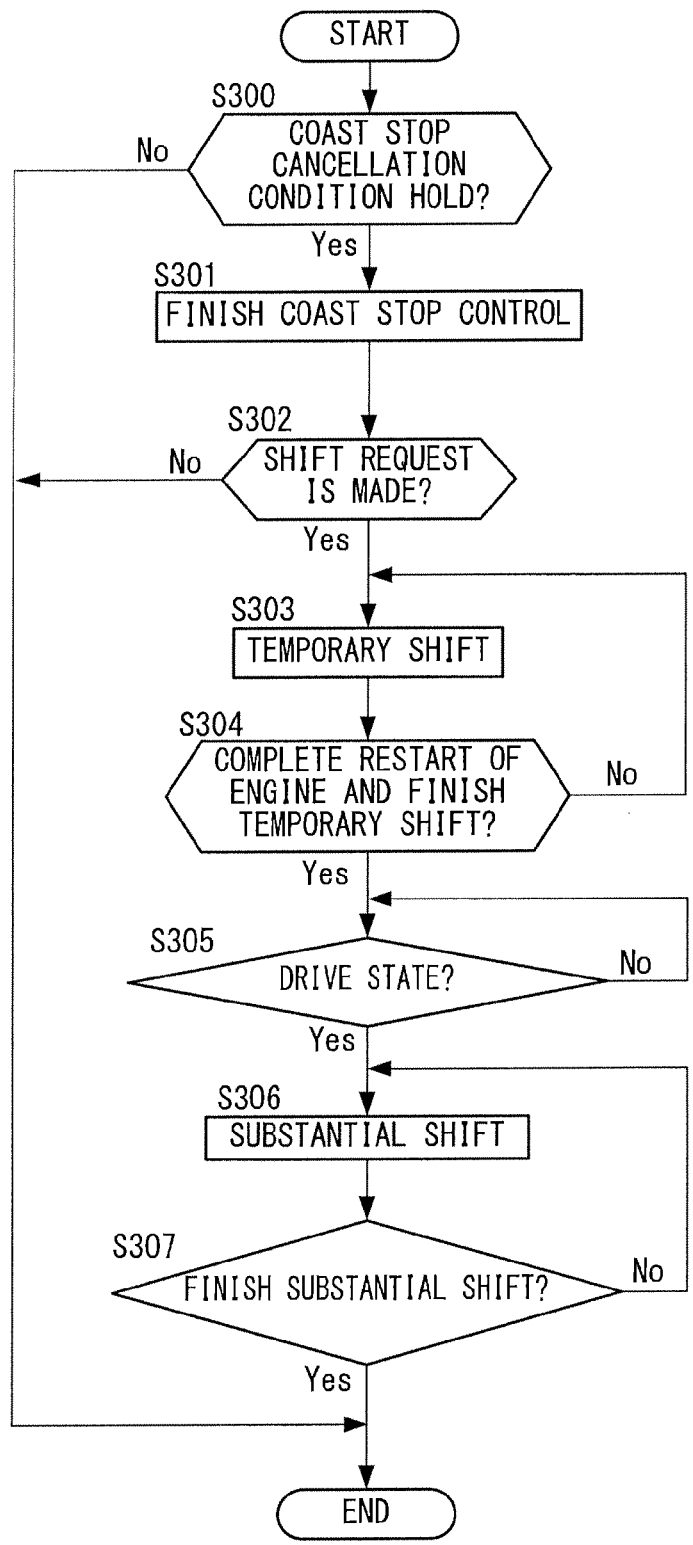
FIG. 9 is a flow chart showing a control performed when a shift request is made immediately after a coast stop control of a third embodiment is finished.

This embodiment relates to a control performed when a shift request by the driver is made immediately after the coast stop control is finished and the engine 1 is restarted. A control of this embodiment is described using a flow chart of FIG. 9.

In Step S300, the controller 12 determines whether or not a coast stop cancellation condition holds. The controller 12 proceeds to Step S301 if the coast stop cancellation condition holds while finishing this control unless the coast stop cancellation condition holds. It should be noted that the coast stop cancellation condition here is, for example, that any one of the above conditions a to d is not satisfied and does not include a shift request by the driver.

In Step S301, the controller 12 finishes the coast stop control by resuming fuel injection into the engine 1.

In Step S302, the controller 12 determines whether or not a shift request is made by the driver. That is, the controller 12 determines whether or not a shift request is made by the driver immediately after the coast stop control is finished. The controller 12 determines whether or not an up-shift command has been output in addition to a down-shift command. The controller 12 proceeds to Step S303 if a shift command to a predetermined speed ratio by the driver has been output while finishing this control unless the shift command by the driver has been output.

It should be noted that immediately after the coast stop control is finished may be within a predetermined time after the end of the coast stop control. That is, the controller 12 may determine whether or not a shift request is made by the driver within the predetermined time after the end of the coast stop control and may proceed to Step S303 if the shift request is made by the driver within the predetermined time. The predetermined time is set at a time which enables the vehicle more quickly become the drive state by performing the temporary shift to attain a speed ratio even higher than the speed ratio based on the shift request by the driver as compared with the case where a shift is performed based on the shift request by the driver without performing the temporary shift. The predetermined time may be a fixed time set in advance or may be a time set according to an operating state such as a vehicle speed.

Steps S303 to S307 are not described here since relating to the same control in Steps S202 to S206 of the second embodiment.

Effects of the third embodiment of the present invention are described.

When the coast stop cancellation condition holds and a down-shift or up-shift command by the driver is output immediately after the engine 1 is restarted, a time until the vehicle becomes the drive state can be further shortened and acceleration responsiveness according to the driver's intention to accelerate can be achieved by performing the substantial shift corresponding to the shift request by the driver after the transmission 4 is temporarily shifted to attain a speed ratio higher than the speed ratio based on the shift request and the vehicle becomes the drive state.

It goes without saying that the present invention is not limited to the above embodiments and includes various possible modifications and improvements within the scope of the technical concept thereof.

Although the transmission 4 includes the variator 20 and the sub-transmission mechanism 30 in the above embodiments, it may be a transmission including only a variator or a step transmission. Further, the variator 20 is not limited to the V-belt continuously variable transmission and may be a chain continuous variable transmission. In the case of performing the temporary shift of the second embodiment using a step transmission, a friction element to be engaged by the temporary shift is desirably precharged during the coast stop control. To engage the friction element and become a power transmission state, it is necessary to fill a hydraulic chamber of the friction element and an oil passage allowing communication between the oil pump and the hydraulic chamber with oil and further supply oil. By filling the hydraulic chamber and the oil passage with oil by precharging during the coast stop control, a time required for the friction element to reach the power transmission state in performing a shift is shortened. This can shorten a time required in performing the temporary shift and shorten a time until the vehicle becomes the drive state after the restart of the engine since the friction element is already in a power transmittable state when the engine rotation speed increases and becomes higher than the turbine rotation speed.

Although, in the above embodiments, the shift corresponding to the shift request is started after the engine rotation speed becomes higher than the turbine rotation speed, the shift corresponding to the shift request may be started after the engine rotation speed becomes equal to or higher than a predetermined speed. The predetermined speed is the higher one of the engine rotation speed at which a hydraulic pressure necessary to perform the driver's shift request can be supplied to the transmission 4 and the turbine rotation speed at which the vehicle becomes the drive state. By this, the shift by the transmission 4 is possible and the shift corresponding to the driver's shift request is performed after the vehicle becomes the drive state. Thus, acceleration responsiveness intended by the driver can be achieved while the shift is reliably performed by the transmission 4. Further, the predetermined speed is set to be higher as the vehicle speed increases. This enables the shift corresponding to the shift request to be appropriately performed based on the vehicle speed.

Although, in the above embodiments, the coast stop control is finished and this control is performed when a start request is made by the driver, the coast stop control may be finished and this control may be performed when another condition such as a condition that the brake pedal is not depressed is further satisfied.

If the speed ratio of the transmission 4 is lowest when a shift request is made by the driver and the engine 1 is restarted, the transmission 4 may be temporarily shifted to a high side and the engine 1 may be restarted and then the transmission 4 may be shifted to the lowest gear.

Although, in the second embodiment, the substantial shift is started after the temporary shift is finished, the temporary shift may be terminated and the substantial shift may be started if the engine rotation speed becomes higher than the turbine rotation speed and the vehicle becomes the drive state during the temporary shift.

Further, the speed ratio by the temporary shift may be set to be higher as the vehicle speed increases. By this, the vehicle can quickly become the drive state even if the vehicle speed is high and acceleration responsiveness intended by the driver can be achieved.

Although whether or not the vehicle is in the drive state is determined using the engine rotation speed and the turbine rotation speed in the above embodiments, there is not limitation to this. Whether or not the vehicle is in the drive state may be determined from a friction element having a rotation difference (e.g. a difference between forward and reverse rotation speeds of a forward/reverse switching mechanism, a difference between forward and reverse rotation speeds of the sub-transmission mechanism) other than the torque converter 2.

What is claimed is:

1. A coast stop vehicle for automatically stopping a drive source
when a predetermined condition holds during travel of the vehicle, comprising:
a drive source control unit adapted to control an automatic stop and a restart of the drive source;
a transmission mechanism provided between the drive source and drive wheels; and
a transmission control unit adapted to control a speed ratio of the transmission mechanism,
wherein, when the drive source is restarted, the transmission control unit is adapted to control the transmission mechanism to the speed ratio which is higher than a predetermined speed ratio such that an input rotation speed of the transmission mechanism becomes lower than an input rotation speed in the predetermined speed ratio in response to an input shift request to the predetermined speed ratio, and
wherein the drive source control unit is adapted to restart the drive source in a state where the speed ratio of the transmission mechanism is higher than the predetermined speed ratio such that the drive source is restarted after an up-shift.

2. The coast stop vehicle according to claim 1, wherein:
the transmission mechanism includes a friction element; and
the transmission control unit is adapted to shift the transmission mechanism to the predetermined speed ratio after a first rotation speed which is a rotation speed of an input side of the friction element becomes higher than a second rotation speed which is a rotation speed of an output side.

3. The coast stop vehicle according to claim 2, wherein the transmission control unit is adapted to perform a down-shift after the first rotation speed becomes higher than the second rotation speed if the input shift request to the predetermined speed ratio is the down-shift.

4. The coast stop vehicle according to claim 2, wherein the transmission control unit is adapted to temporarily shift the transmission mechanism to the speed ratio which is higher than the predetermined speed ratio and to shift the transmission mechanism to the predetermined speed ratio after the first rotation speed becomes higher than the second rotation speed.

5. The coast stop vehicle according to claim 4, further comprising:
a vehicle speed detection unit adapted to detect a vehicle speed,
wherein the speed ratio which is higher than the predetermined speed ratio becomes higher as the vehicle speed increases.

6. The coast stop vehicle according to claim 2, further comprising:
an oil pump adapted to supply oil to the transmission mechanism by power generated by the drive source; and
a rotation speed detection unit adapted to detect a rotation speed of an output shaft of the drive source;
wherein the transmission control unit is adapted to shift the transmission mechanism to the predetermined speed ratio when the rotation speed of the output shaft of the drive source becomes higher than a predetermined speed; and
wherein the predetermined speed is the higher one of the second rotation speed and a rotation speed at which oil necessary to shift the transmission mechanism to the predetermined speed ratio is supplied to the transmission mechanism.

7. The coast stop vehicle according to claim 6, further comprising:
a vehicle speed detection unit adapted to detect a vehicle speed,
wherein the predetermined speed increases as the vehicle speed increases.

8. A control method for controlling a coast stop vehicle which automatically stops a drive source when a predetermined condition holds during travel of the vehicle and includes a transmission mechanism between the drive source and drive wheels, comprising:
controlling the transmission mechanism to a speed ratio which is higher than a predetermined speed ratio such that an rotation speed of the transmission mechanism becomes lower than the input rotation speed in the predetermined speed ratio in response to an input shift request to the predetermined speed ratio when the drive source is restarted; and
restarting the drive source in a state where the speed ratio of the transmission mechanism is higher than the predetermined speed ratio such that the drive source is restarted after an up-shift.

9. The control method according to claim 8, wherein:
the transmission mechanism includes a friction element; and
the transmission mechanism is shifted to the predetermined speed ratio after a first rotation speed which is a rotation speed of an input side of the friction element becomes higher than a second rotation speed which is a rotation speed of an output side.

10. The control method according to claim 9, wherein a down-shift is performed after the first rotation speed becomes higher than the second rotation speed if the input shift request to the predetermined speed ratio is the down-shift.

11. The control method according to claim 9, wherein the transmission mechanism is temporarily shifted to the speed ratio which is higher than the predetermined speed ratio and the transmission mechanism is shifted to the predetermined speed ratio after the first rotation speed becomes higher than the second rotation speed.

12. The control method according to claim 11, further comprising:
    detecting a vehicle speed,
    wherein the speed ratio which is higher than the predetermined speed ratio becomes higher as the vehicle speed increases.

13. The control method according to claim 9, further comprising:
    supplying oil to the transmission mechanism by power generated by the drive source; and
    detecting a rotation speed of an output shaft of the drive source;
    wherein the transmission mechanism is shifted to the predetermined speed ratio when the rotation speed of the output shaft of the drive source becomes higher than a predetermined speed; and
    wherein the predetermined speed is the higher one of the second rotation speed and a rotation speed at which oil necessary to shift the transmission mechanism to the predetermined speed ratio is supplied to the transmission mechanism.

14. The control method according to claim 13, further comprising:
    detecting a vehicle speed,
    wherein the predetermined speed increases as the vehicle speed increases.

15. A coast stop vehicle for automatically stopping a drive source when a predetermined condition holds during travel of the vehicle, comprising:
    drive source control means for controlling an automatic stop and a restart of the drive source;
    a transmission mechanism provided between the drive source and drive wheels; and
    transmission control means for controlling a speed ratio of the transmission mechanism,
    wherein, when the drive source is restarted, the transmission control means controls the transmission mechanism to the speed ratio which is higher than a predetermined speed ratio such that an input rotation speed of the transmission mechanism becomes lower than the input rotation speed in the predetermined speed ratio in response to an input shift request to the predetermined speed ratio, and
    wherein the drive source control means restarts the drive source in a state where the speed ratio of the transmission mechanism is higher than the predetermined speed ratio such that the drive source is restarted after an up-shift.

* * * * *